United States Patent [19]
Delamater

[11] 3,745,910
[45] July 17, 1973

[54] ROASTING SPIT

[76] Inventor: William B. Delamater, 9114 Valley View, Whittier, Calif. 90603

[22] Filed: Jan. 4, 1972

[21] Appl. No.: 215,298

[52] U.S. Cl. ................................................ 99/419
[51] Int. Cl. .......................................... A47j 37/04
[58] Field of Search................... 99/419, 420, 421 A; 294/50, 50.5, 55.5, 61

[56] References Cited
UNITED STATES PATENTS

| | | | |
|---|---|---|---|
| 2,191,226 | 2/1940 | Clem................................ | 99/419 X |
| 2,250,313 | 7/1941 | Petz et al........................... | 294/50.5 |
| 2,629,313 | 2/1953 | Norville, Jr. et al.............. | 99/421 A |

FOREIGN PATENTS OR APPLICATIONS

| | | | |
|---|---|---|---|
| 135,321 | 11/1949 | Australia........................... | 99/421 A |

*Primary Examiner*—William I. Price
*Assistant Examiner*—Arthur O. Henderson
*Attorney*—J. Calvin Brown

[57] ABSTRACT

The roasting spit includes an elongated shaft of substantially square section, one end of the shaft is provided with a handle and the opposite end transversely secures a disk provided with transverse perforations adjacent the rim thereof. A round sleeve is slidable upon the square shaft, the sleeve provided with a handle for moving the sleeve, the opposite end of the sleeve being square sectioned and provided with a central disk of smaller diameter than the disk secured to the square shaft. A further sleeve is secured to the shaft handle and telescopically receives the round sleeve. Tines are secured to the small diameter disk and project through the perforations of the larger disk whereby the round sleeve handle is moved forwardly the tines flare beyond the larger disk, the tines being drawn inwardly of the larger disk when the sleeve handle is moved toward the shaft handle. Thus various food items such as wieners, may be impaled upon the tines whereby the food article may be roasted over a fire, the food articles being released from the tines when the sleeve is moved by its handle to retract the smaller diameter disk and to retract the tines.

6 Claims, 6 Drawing Figures

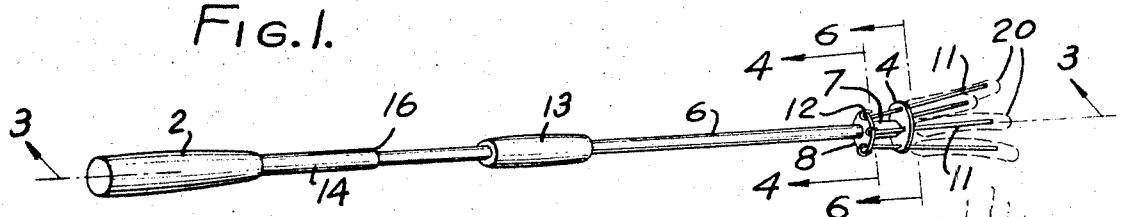
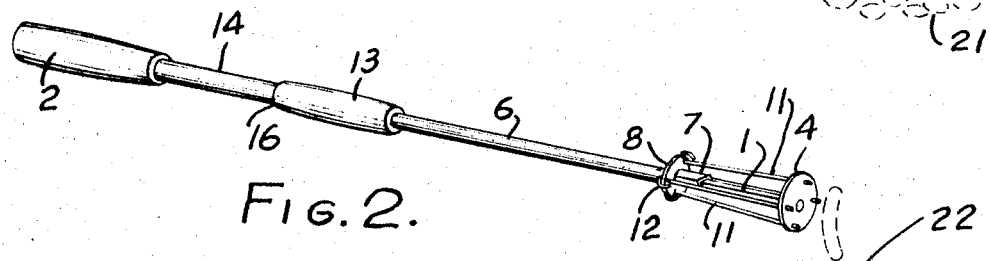
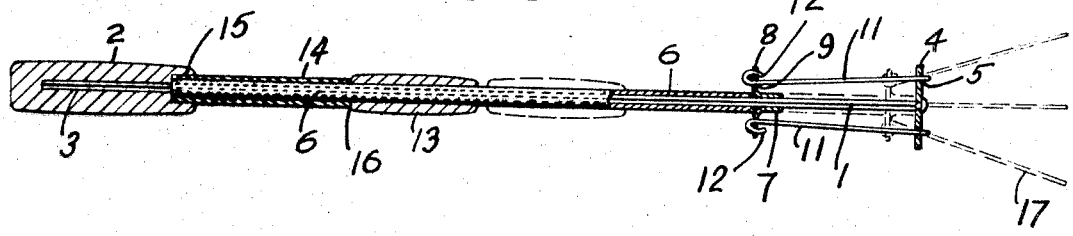
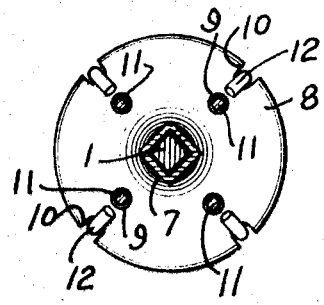
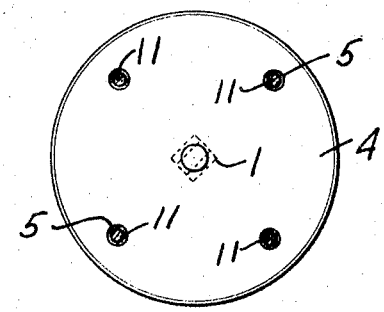
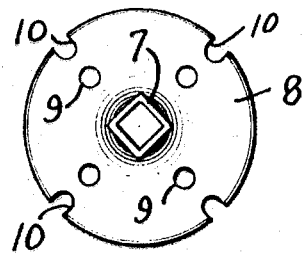

ROASTING SPIT

BACKGROUND OF THE INVENTION

The device relates to retractable spits or tines of the type which may impale or hold a food article and, likewise, release said food article from the tines or the spit.

SUMMARY OF THE INVENTION

The invention provides an easy method of roasting food articles over a coal fire particularly for barbeques. An elongated substantially square sectioned shaft is provided at one end with a fixed handle which may be grasped by the user. The opposite end of the shaft centrally secures a transverse disk which may be provided with equidistantly spaced perforations or bores adjacent the rim thereof. A round sleeve is slidable upon the square shaft and the sleeve is square sectioned for a given distance at one end thereof so as to prevent turning movement relative to the shaft. The round sleeve is of small diameter and is movable into a larger diameter sleeve secured to the fixed handle for the shaft. A disk of smaller diameter than the first named disk is centrally secured to the small diameter round sleeve at the squared end portion thereof. Tines are secured to the small diameter disk and passed through the perforations of the larger disk. A handle is carried by the round sleeve of small diameter and the handle is so positioned relative to said sleeve that the handle may move the smaller sleeve inward of the larger diameter sleeve secured to the fixed handle of the square shaft. This movement will, likewise, move the small disk and cause separation between the large disk and the small disk to retract the tines relative to the large disk, the two disks being of different diameter cause the tines to flare outwardly beyond the large disk when the disks approach each other and to retract the tines when the disks are separated. The sleeve of larger diameter limits the retraction of the tines as the handle carried by the small diameter sleeve will engage an end of said larger diameter sleeve. The square sectioned end of the sleeve of small diameter limits the approach of the two disks.

An object of the invention is to provide a roasting spit which may easily impale or receive various objects to be held by the tines when the tines are flared outwardly. The food article to be roasted is to be held by handles which are formed of a non-heat conducting material and the device is easily manipulated so as to readily engage the food article and to release the food article after being roasted.

BRIEF DESCRIPTION OF THE DRAWINGS

FIG. 1 is a perspective view of the roasting spit, looking from the handle end toward the tine end;

FIG. 2 is a perspective view looking from the tine end of the roasting spit toward the handle end;

FIG. 3 is a sectional view on the line 3—3 of FIG. 1, on an enlarged scale;

FIG. 4 is a sectional view on the line 4—4 of FIG. 1, and on an enlarged scale;

FIG. 5 is a plan view of the disk shown in FIG. 4; and,

FIG. 6 is a sectional view on the line 6—6 of FIG. 1, and on an enlarged scale.

DESCRIPTION OF THE PREFERRED EMBODIMENT

The roasting spit includes an elongated square shaft 1 provided with a handle 2 for one end of said shaft as shown at 3 in pressed fit engagement. The opposite end of the square shaft is centrally secured to a transverse disk 4, the disk being provided with transverse perforations 5 which are equidistantly spaced apart and adjacent the rim of said disk. In the present instance four perforations are shown for illustrative purposes only. A small diameter round sleeve 6 closely embraces the square shaft and the outer end of said sleeve 6 is provided with a square sectioned portion 7, the square sectioned portion 7 is slidable upon the square shaft to prevent rotation of the sleeve 6 on the shaft. Centrally secured to the sleeve 6 at the junction between the round portion and the squared portion 7 is a disk 8 of lesser diameter than the disk 4. The disk 8 is provided with transverse perforations 9 equidistantly spaced apart and of the same number thereof as contained in the disk 4. Disk 8 is provided with spaced notches 10 leading from the rim of the disk toward the perforations 9 but not intersecting the perforations. A single notch 10 and a perforation 9 lie upon a radius of the disk. Tines 11 are provided, the number thereof corresponding to the number of perforations in each disk, that is to say, four tines. One end of each tine is bent to form a curved hook, as shown at 12. A length of the tine is passed through a perforation 9 and the hook is received in a notch 10. The main length of each tine is passed through a perforation 5 of disk 4.

A handle 13 is carried by the round sleeve 6 and is in pressed fit engagement therewith. A large diameter round sleeve 14 surrounds sleeve 6 is pressed fit engagement within an end of the handle 2 as shown at 15. The outer end of sleeve 14 is swaged inwardly as shown at 16 to fit closely upon the sleeve 6. An end of the handle 13 is adapted to engage the end 16 of the sleeve 15 to limit movement thereof in one direction while the square sectioned sleeve 7 limits movement of the sleeve in the opposite direction. Thus, when the handle 2 is grasped in one hand by the user of the device, the handle 13 may be moved from the full line position of FIGS. 2 and 3, to the dotted line position 17 of FIG. 3. Inward movement of the handle 13 maintains the tines in the position shown in FIG. 2 and by full lines in FIG. 3. The dotted line position 17 for said handle 13 moves the disk 8 toward the disk 4 to extend the tines beyond disk 4 and to cause a flare of the tines as shown in the dotted line position for said tines in FIG. 3. The length of the square sleeve portion 7 limits the approach between the two disks. Movement of the handle 13 from the dotted line position 17 of FIG. 3 to the full line position of said Figure retracts the tines from the dotted line position of said Figure to the full line position.

In FIG. 1 the food articles such as wieners are shown in dotted lines at 20, the wieners being impaled upon the tines and when so impaled the food carrying end of the spit may be held adjacent coals or other heating medium such as shown at 21 for the purpose of roasting or otherwise heating the food article. When the food articles have been heated the desired amount, the handle 13 may be moved from the position shown in FIG. 1 to the position shown in FIG. 2 which will retract the tines relative to the disk 4 and dislodge the food articles as shown in FIG. 2 at 22.

The present roasting spit is superior to means now employed such as the use of a fork for impaling the food article such as a wiener than using some extraneous implement for removing the wieners from the fork.

The device is sanitary and performs its function of the impaling and the removal of a food article by the same device without employment of extraneous devices or use of the hands to apply the food article to the tines or to remove the same from the tines. If chunks of meat are to be roasted the tines may be employed in the full flared position as shown in FIGS. 1 and 3 with the meat article positioned between the tines. The roasting of the food article will then follow after which the food article may then be released on a plate by retracting the tines.

The device is easily cleaned and movement of the tines through the perforations of the larger diameter disk tends to remove any food adhering to said tines and a simple washing of the device is all that is necessary to maintain the same sanitary. The tines and associated disks constitute the head of the spit while the handles are means for manipulating elements of the head.

I claim:

1. A roasting spit comprising an elongated square cross sectioned shaft, a sleeve carried on said shaft for slide movement thereon, a first disk centrally secured to one end of the shaft, a second disk of smaller diameter than the first disk centrally secured to the sleeve, each disk provided with the same number of spaced apart perforations, and tines passed through the perforations of the first disk and rockably secured in the perforations of the second disk, movement of the sleeve in one direction causing the disks to approach to move the tines to a flared position beyond the first disk and movement of the sleeve in the opposite direction separating the disks and retracting the tines between the two disks.

2. The device as set forth in claim 1, the square shaft provided at one end with a handle for manipulating the device.

3. The device as set forth in claim 1, the round sleeve provided with a sleeve type handle for moving the sleeve and the second disk.

4. The device as set forth in claim 1, wherein the square shaft is provided with an end handle and a sleeve extending beyond said end handle in axial alignment therewith for receiving the first sleeve in either a retracted position thereof or an extended position.

5. A roasting spit, including: a square sectioned shaft, a fixed handle for one end of said shaft, a round sleeve carried on said shaft one end of said round sleeve having a square sectioned portion fitting upon the square sectioned shaft for preventing relative rotation therebetween, the outer end of said square sectioned shaft provided centrally with a disk having transverse perforations adjacent the rim thereof, a second disk of smaller diameter than the first mentioned disk carried by the round sleeve and tines rockably secured to the second disk and extending through the perforations of the first disk whereby movement of the second disk toward the first disk causes the tines to advance in a flare beyond the first disk and separation between said disks retracting the tines between said disks.

6. The device as set forth in claim 5, and a sleeve type handle carried by the round sleeve for manipulating said sleeve when the first handle is held.

* * * * *